Dec. 12, 1950 E. H. PACE ET AL 2,533,616
APPARATUS FOR FREEZING FLUIDS
Filed June 30, 1945 2 Sheets-Sheet 2
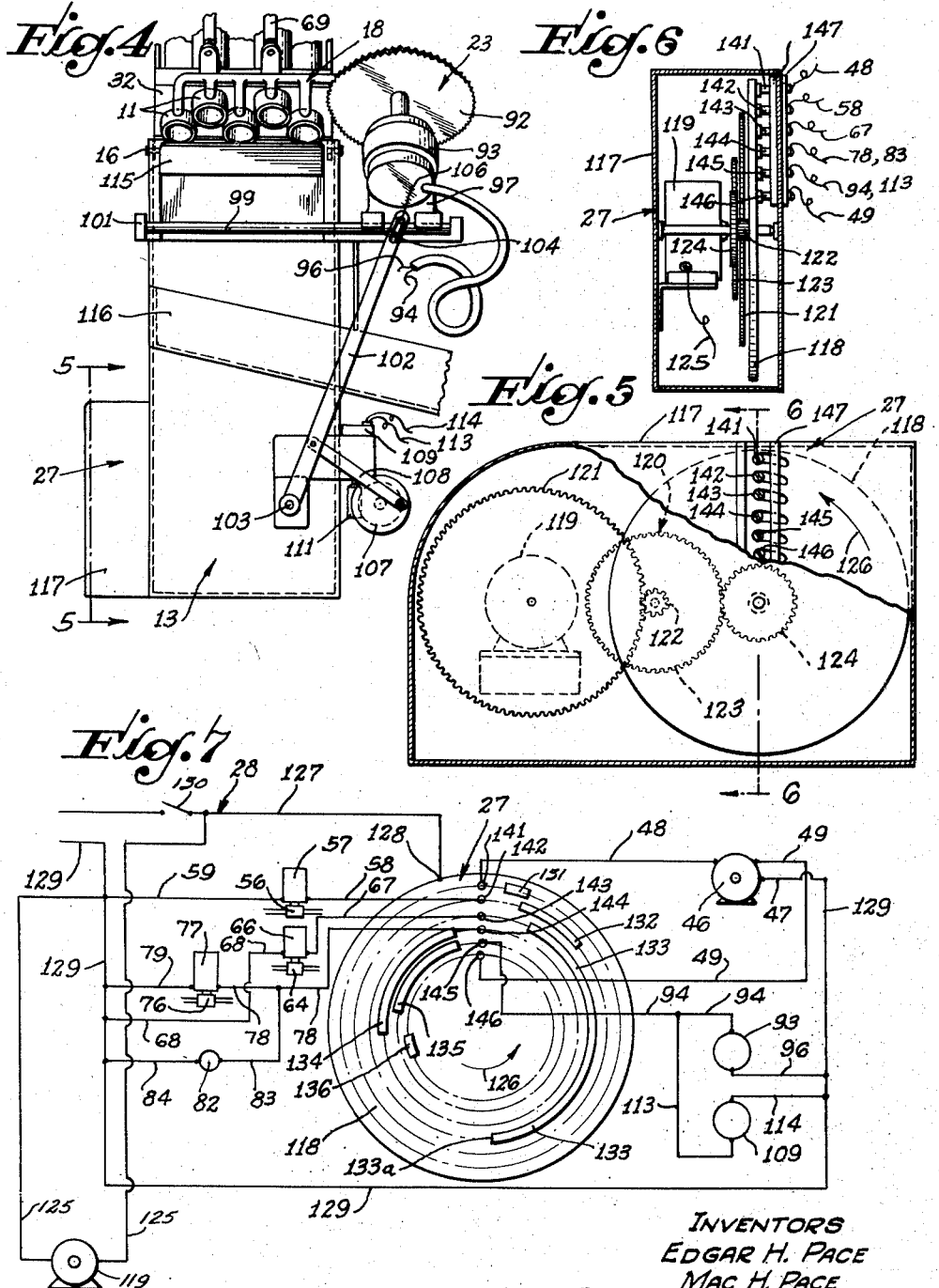
INVENTORS
EDGAR H. PACE
MAC H. PACE
BY HARRIS, KIECH, FOSTER & HARRIS
FOR THE FIRM
ATTORNEYS Patented Dec. 12, 1950

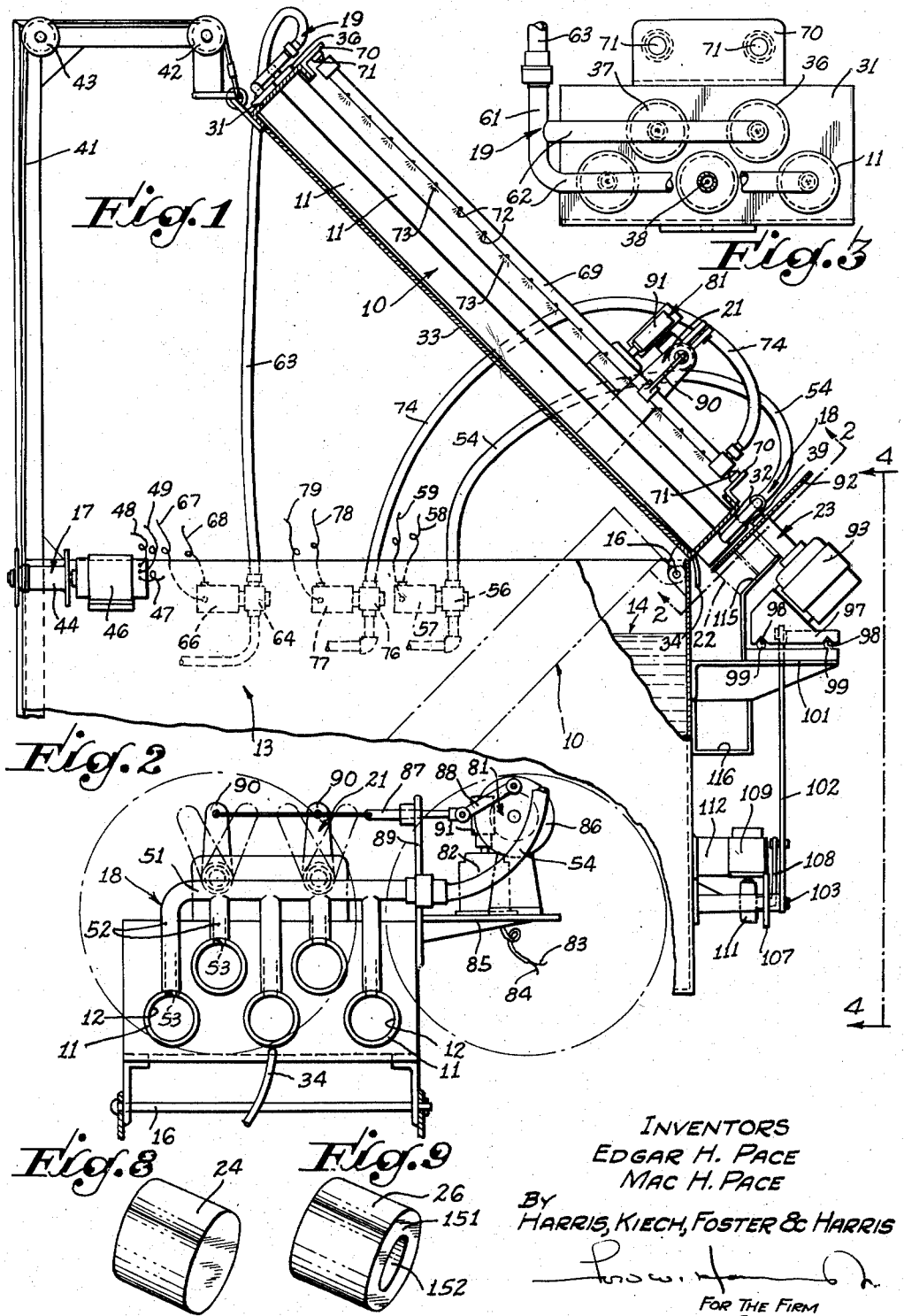

2,533,616

UNITED STATES PATENT OFFICE 2,533,616

APPARATUS FOR FREEZING FLUIDS

Edgar H. Pace, Montebello, and Mac H. Pace, Whittier, Calif.

Application June 30, 1945, Serial No. 602,576

9 Claims. (Cl. 62—106)

Our invention relates in general to a method of and apparatus for freezing fluids and the present specification includes a particular application of an exemplary embodiment of the invention to the production of ice wherein the fluid to be frozen is water. The particular application and exemplary embodiment disclosed herein are intended to enable those proficient in the art to practice these and various other embodiments of and applications for our underlying inventive concepts.

Perhaps the most universally accepted method of producing ice commercially involves the immersion of a relatively large body of water in a suitable refrigerant to form a block of ice which may weigh several hundred pounds. Although the surface portions of the body of water, being in close proximity to the refrigerant, may freeze at a relatively rapid rate, the low thermal conductivity of the surface layer of ice which is formed in this manner so reduces the rate of heat transfer from the central portion of the body of water that the remainder of the freezing operation requires an extensive period of time. Since the water being frozen ordinarily contains various impurities, the resulting block of ice is frequently opaque, an undesirable characteristic for many applications of the ice. During the freezing operation, the central portion of the body of water tends to circulate because of the temperature gradients therein, thus carrying the impurities toward the center of the body of water and resulting in a block of ice of non-uniform opacity.

Many applications of ice require that the blocks of ice formed in the foregoing manner be reduced to smaller particles. The blocks may be reduced either to particles of an irregular size and shape which are conventionally termed crushed ice, or to ice units of a uniform size and shape which may include cubes, cylinders, prisms, or other configurations of various sizes. The conventional method of producing ice units commercially involves sawing the blocks of ice into cubes, a process which is relatively expensive and which results in the destruction of a large percentage of each block in the form of particles which are removed by the saw blades. Since the ice units are frequently employed for chilling beverages, for example, clear units are desirable and are ordinarily not obtainable by conventional methods.

In view of the foregoing considerations, one of the primary objectives of our invention is the provision of a method of and apparatus for producing units of frozen fluid at a faster rate than is possible with conventional methods. We prefer to achieve this objective by employing a freezing unit which may be immersed in a suitable refrigerant and which includes one or more tubes of a relatively small cross section which are adapted for receiving the fluid to be frozen, the latter being known hereinafter as the primary fluid which may, for example, be water. Since the cross-sectional area of the tubes is preferably relatively small, the time required for the freezing operation is considerably reduced because of the relatively thin layers of frozen primary fluid through which heat must be conducted.

The configuration of the cross section of the tubes of the freezing unit is determined by the desired cross-sectional configuration of the frozen units and may be circular, square, rectangular, etc. When the freezing unit is immersed in the refrigerant, the water in the tubes congeals to form frozen rods having the desired cross-sectional shape, an objective of our invention being the provision of a means for severing the rods into units of the desired size.

Another primary objective of our invention is the provision of a method of and means for circulating the primary fluid within the tubes during the freezing operation for the purpose of removing foreign matter and impurities from the frozen rods. We contemplate achieving the latter objective by introducing a circulating fluid such as air into the tubes to circulate the primary fluid therein, thus preventing entrapment of any foreign matter in the frozen fluid. We further contemplate a method wherein the flow of the circulating fluid is terminated prior to completion of the freezing operation, thus permitting any foreign matter in the central portion of the primary fluid in the tube to become entrapped to form frozen rods with a clear surface layer and an opaque core. The freezing operation may also be terminated prior to completion thereof to provide hollow or tubular rods if desired.

A further primary objective of our invention includes the introduction of coloring matter into the primary fluid to be frozen to produce colored rods which may be severed into units of the desired size. We contemplate introducing a circulating fluid into the tubes of the freezing unit during various portions of the freezing operation to prevent entrapment of the coloring matter in the frozen primary fluid and contemplate terminating the circulation during other portions of the freezing operation to permit entrapment of the coloring matter. In this manner, for example, rods and units may be produced with a clear surface layer and a colored core, with a colored surface layer and a clear core, or with alternate layers of clear and colored frozen fluid, the provision of such frozen units being an additional objective of our invention.

A realization of the foregoing objectives of our invention may be realized by the provision of a method of and apparatus for refrigerating the freezing unit, introducing the clear or colored primary fluid into the tubes of the freezing unit, circulating the primary fluid in the tubes during the desired portion or portions of the freezing operation, thawing the freezing unit to release the rods from the tubes, and severing the rods to form units of frozen primary fluid of the desired size.

An additional primary objective of our invention is to provide an apparatus of the foregoing general character which is adapted for partially or fully automatic operation.

The foregoing and various other objectives and advantages of our invention may be realized by means of the aforesaid exemplary embodiment which is described in the subsequent disclosure and shown in the accompanying drawings, which are for illustrative purposes only, wherein:

Fig. 1 is an elevational view of the exemplary embodiment of our invention with portions thereof being shown in section;

Fig. 2 is an end view of the freezing unit, taken in the direction of the arrows intersecting the broken line 2—2 of Fig. 1, and illustrates means for filling and thawing the tubes thereof;

Fig. 3 is an end view of the opposite end of the freezing unit and illustrates means for introducing the circulating fluid into the tubes;

Fig. 4 is an elevational view of means for severing rods of frozen primary fluid;

Fig. 5 is an elevational view of means for effecting automatic operation of the freezing apparatus;

Fig. 6 is a sectional view taken as indicated by the broken line 6—6 of Fig. 5;

Fig. 7 is a diagrammatic view of an electrical circuit for effecting automatic operation of the freezing apparatus; and Figs. 8 and 9 are perspective views illustrating exemplary units of frozen primary fluid which may be produced by the freezing method and apparatus.

Referring to the freezing apparatus in general, the apparatus includes a freezing unit which is indicated by the numeral 10 and includes a plurality of tubes 11 having circular bores 12 therethrough. The freezing unit 10 is attached to a receptacle 13 for a refrigerant 14 by a pivot 16 and is provided with means 17 for effecting inclination thereof relative to the refrigerant receptacle 13. The inclining means 17 is adapted to lower the freezing unit 10 into a freezing position wherein the unit 10 is disposed in the receptacle 13 as indicated in phantom in Fig. 1, and is adapted to elevate the freezing unit 10 into a harvesting position as illustrated in solid lines.

The freezing apparatus is provided with means 18 for introducing the fluid to be frozen, or primary fluid, into the tubes 11 and is provided with means 19 for circulating the primary fluid within the tubes 11, the circulating means 19 being adapted to introduce a circulating fluid such as air into the tubes 11. The freezing apparatus also includes means 21 for heating the freezing unit 10 to release rods 22 of frozen primary fluid (shown in phantom in Fig. 1) from the tubes 11 when the unit 10 is in the harvesting position, the frozen rods 22 thereafter being cut into suitable lengths by severing means 23 to produce units 24 and 26 of frozen primary fluid as illustrated in Figs. 8 and 9. The thawing means 21 is preferably adapted to spray a thawing fluid such as hot water or steam over the freezing unit 10 to thaw the surface of the frozen rods 22 to effect their release from the tubes 11.

We prefer to adapt the freezing apparatus for fully automatic operation and have provided an electrical timing device 27 for actuating the various components of the apparatus at the proper intervals in the operating cycle thereof, the timing device 27 being connected to the aforesaid components by an electrical circuit which is indicated generally by the numeral 28.

Referring to the structure of the freezing apparatus in detail, the tubes 11 of the freezing unit 10 are secured in spaced relationship by end plates 31 and 32 in any desired manner, the end plates 31 and 32 being interconnected by a drain plate 33 which serves to direct the thawing fluid to a drain tube 34 to prevent entrance of the thawing fluid into the refrigerant receptacle 13. The thawing fluid may be conducted to any desired disposal point by the drain tube 34, only a fragment of the tube 34 being illustrated for the purpose of preserving the clarity of the drawings. One end 36 of each tube 11 is enclosed by a cap 37, or the like, each cap 37 being provided with an orifice 38 therethrough of an appropriate size to regulate the flow of circulating fluid into the tubes 11 from the circulating means 19. The opposite end 39 of each tube 11 communicates with the means 18 for introducing the primary fluid into the tubes 11.

The inclining means 17 includes a cable 41, or the like, which is secured to the freezing unit 10 and is trained over pulleys 42 and 43 and a drum 44. The latter is driven by a reversible electric motor 46 which is connected to the timing device 27 by conductors 47, 48, and 49 which are included in the electrical circuit 28. When current flows through the conductors 47 and 48, the motor 44 lowers the freezing unit 10 into the freezing position, and when the conductors 47 and 49 are energized the freezing unit 10 is elevated into the harvesting position as will be described in detail hereinafter.

The means 18 for introducing the primary fluid into the tubes 11 includes a filler tube 51 having branches 52 which are secured to the ends 39 of the tubes 11 and which communicate with the bores 12 thereof through openings 53. The filler tube 51 is connected to a primary fluid supply line 54 which is in turn connected to a suitable source of primary fluid (not shown), the primary fluid being either colored or colorless as desired. The supply line 54 is provided with a valve 56 therein, the latter being adapted for actuation by a solenoid 57 which is connected to the timing device 27 by conductors 58 and 59.

The circulating means 19 includes a supply tube 61 having branches 62 which are secured to the caps 37 enclosing the ends 36 of the tubes 11, each branch 62 being in communication with one of the tube bores 12 through one of the orifices 38. The latter are of an appropriate size to permit introduction of the circulating fluid at a rate consistent with the desired circulation rate of the primary fluid within the tubes 11. The supply tube 61 is connected to a supply line 63 which is in turn connected to a suitable source of the circulating fluid (not shown), the circulating fluid preferably being compressed air. The supply line 63 is provided with a valve 64 therein, the latter being adapted for actuation by a solenoid 66 which is connected to the timing device 27 by conductors 67 and 68.

The thawing means 21 includes spray tubes 69 which are attached to brackets 70 on the end plates 31 and 32 of the freezing unit 10 by pivots 71, the spray tubes 69 having perforations 72 therein to spray the thawing fluid over the tubes 11 as indicated at 73. The spray tubes 69 are connected to a supply line 74 which is in turn connected to a thawing fluid source (not shown), the thawing fluid being hot water or steam, for example, when the primary fluid is water. The supply line 74 is provided with a valve 76 therein, the latter being actuable by a solenoid 77 which is connected to the timing device 27 by conductors 78 and 79. In order to insure that the spray 73 contacts all of the tubes 11 uniformly, the spray tubes 69 are preferably adapted for oscillation by an oscillating mechanism 81. The latter includes an electric motor 82 which is connected to the timing device 27 by conductors 83 and 84, the motor 82 being mounted on a support 85 which is secured to the freezing unit 10 and being adapted to drive a rotary plate 86. The rotary plate 86 is connected to a reciprocable member 87 by a pivotal link 88, the reciprocable member 87 being supported by a bracket 89 and being pivotally connected to arms 90 which are connected to the spray tubes 69. As the motor 82 rotates, the spray tubes 69 oscillate to spray the tubes 11 with thawing fluid in a uniform manner, the expended thawing fluid being carried to the drain tube 34 by the drain plate 33. A suitable reduction gearing 91 may be provided to interconnect the motor 82 and rotary plate 86 if desired.

The severing means 23 includes a circular saw 92 which is driven by a motor 93, the latter being connected to the timing device 27 by conductors 94 and 96. The saw motor 93 is attached to a reciprocable mount 97 which is provided with grooves 98 therein, the latter being adapted for engagement with tracks 99 to permit reciprocation of the saw 92 relative to the freezing unit 10 to sever the frozen rods 22 into units 24 and 26. The tracks 99 are supported by a frame 101 which is attached to the refrigerant receptacle 13. The mount 97 for the motor 93 is reciprocated by means of a lever 102 which is pivotally attached to the refrigerant receptacle 13 at 103 and is provided with an elongated slot 104 therein which accommodates a peg 106 on the motor mount 97. The lever 102 is connected to a rotary plate 107 by a pivotal link 108, the rotary plate 107 being driven by an electric motor 109 through a reduction gear train 111. The motor 109 is mounted on a bracket 112 which is attached to the refrigerant receptacle 13 and is connected to the timing device 27 by conductors 113 and 114. The motor 109 acts through the mechanism previously described to reciprocate the saw 92, the saw motor 93 and reciprocating motor 109 being adapted for simultaneous operation as will be described in detail hereinafter. As the saw 92 severs the frozen rods 22, which slide downwardly against a stop-plate 115, to form the ice units 24 and 26, the latter drop into a suitable chute 116 and are conducted thereby to any desired collection point (not shown).

The timing device 27 is adapted for effecting automatic actuation of the foregoing components of the freezing apparatus according to a predetermined sequence of events in the operating cycle thereof, the timing device 27 being connected to the aforesaid components by the various components of the electrical circuit 28 which have been indicated previously. The timing device 27 is mounted in a suitable housing 117, which may be disposed in any suitable location, and includes a timing plate 118 which is driven by a motor 119 through a reduction gear train 120 which includes gears 121, 122, 123, and 124, the motor 119 being connected to a suitable source of power supply by conductors 125. The speed reduction offered by the gear train 120 is preferably such that the length of the operating cycle of the freezing apparatus is substantially equal to the time required to effect one complete revolution of the timing plate 118 in the direction of the arrow 126.

The timing plate 118 is an electrical conductor and is connected to a primary conductor 127 by a sliding contact 128, the primary conductor 127 and another primary conductor 129 being connected to a source of electrical power supply. The motor 119 for driving the timing plate 118 is shown as connected across the primary conductors 127 and 129 by the conductors 125, a main switch 130 being located in the primary conductor 127. The timing plate 118 is provided with raised contact bars 131, 132, 133, 134, 135, and 136 thereon which are in the form of circularly arcuated segments and are electrically connected to the primary conductor 127 by the timing plate 118, the mounting of the latter being suitably insulated. The contact bars 131 to 136 inclusive, are adapted for slidable engagement with contacts 141, 142, 143, 144, 145, and 146, respectively, the latter being mounted on the timer housing 117 by suitable insulators 147. The contacts 141 to 146, inclusive, are connected to the primary conductor 129 through the various components of the electrical circuit 28.

Considering the components of the electrical circuit 28 in detail, the lowering circuit of the inclining means 17 is connected to the contact 141 and includes the conductors 47 and 48 and the reversible motor 46, the conductor 47 being connected to the primary conductor 129. The elevating circuit of the inclining means 17 is connected to the contact 146 and includes the conductors 47 and 49 and the reversible motor 46.

The circuit of the tube filling means 18 is connected to the contact 142 and includes the solenoid 57 and the conductors 58 and 59, the latter conductor being connected to the primary conductor 129. The circuit of the circulating means 19 is connected to the contact 143 and includes the solenoid 66 and the conductors 67 and 68, the conductor 68 being connected to the primary conductor 129.

The circuit of the thawing means 21 is connected to the contact 144 and includes the conductor 78, the latter being connected to the solenoid 77 and to the oscillating motor 82 through the conductor 83. The solenoid 77 and oscillating motor 82 are connected to the primary conductor 129 by the conductors 79 and 84, respectively. It will be apparent that the solenoid 77 and motor 82 are connected in parallel to provide for simultaneous oscillation of the spray tubes 69 and discharge of the thawing fluid therefrom.

The circuit of the severing means 23 is connected to the contact 145 and includes the conductor 94 which is connected to the saw motor 93 and to the conductor 113, the latter being connected to the motor 109 for reciprocating the saw 92. The saw motor 93 and reciprocating motor 109 are each connected to the primary conductor 129 by conductors 96 and 114, respectively, the parallel connection of the motors 93 and 109 being provided to effect simultaneous rotation and reciprocation of the circular saw 92.

The foregoing freezing apparatus is an exemplary embodiment of our invention which is adapted for accomplishing the various steps of our method of freezing fluids which were outlined previously. The operation of the exemplary embodiment of the freezing apparatus may best be described by considering the sequence of events of the operating cycle thereof as determined by the timing device 27, the initial position of the freezing apparatus being taken as the harvesting position after completion of the preceding harvesting operation. The description of the operation of the freezing apparatus will be limited to the aforesaid exemplary application of the invention for convenience with no intention of limiting the scope of the invention thereto. Water will be employed as the primary fluid and, for example, air and water may be employed as the circulating and thawing fluids respectively.

As the timing plate 118 is driven by the motor 119 through the gear train 120 in the direction of the arrow 126, the contact bar 131 engages the contact 141 to close the lowering circuit of the inclining means 17. The motor 46 is energized and lowers the freezing unit 10 into the refrigerant receptacle 13, the time required for lowering the freezing unit 10 being the factor which determines the length of the contact bar 131. As indicated in phantom in Fig. 1, the freezing unit 10 is preferably not completely immersed in the refrigerant 14 so that the ends 39 of the tubes 11 are above the surface of the refrigerant 14 for reasons which will be stated hereinafter.

After the freezing unit 10 has been lowered into the refrigerant receptacle 13, the contact bar 132 engages the contact 142 to close the circuit of the means 18 for introducing water into the tubes 11 of the freezing unit 10. The solenoid 57 is energized and opens the valve 56 to permit water to enter the tubes 11 through the supply line 54, the length of the contact bar 132 being determined by the time required to fill the tubes 11. The overlap of the contact bars 131 and 132 is not essential and has been included to expedite filling of the tubes 11.

While the tubes 11 are being filled with water, or thereafter, the contact bar 133 engages the contact 143 to close the circuit of the means 19 for introducing air into the tubes 11. The solenoid 66 is energized and opens the valve 64 to introduce air in to the ends 36 of the tubes 11 through the supply line 63. The air traverses the tubes 11 and escapes from the ends 39 thereof, thus circulating the water therein to produce clear ice as the refrigerant 14 causes the water in the tubes 11 to congeal. Since the tubes 11 are preferably not completely immersed in the refrigerant 14, the water adjacent the ends 39 thereof does not freeze completely and serves to accumulate foreign matter delivered by the circulating air. The reason that the water in the nonsubmerged portions of the tubes 11 does not freeze, or freezes only partially, is, of course, that heat must be conducted therefrom to the refrigerant 14 along paths of much greater length than the paths along which heat is conducted from the water in the submerged portions of the tubes. As will be apparent, the lengths of the paths along which heat is conducted from the water in the submerged portions of the tubes 11 are equal only to the wall thickness of the tubes, whereas the lengths of the paths along which heat is conducted from the water in the nonsubmerged portions of the tubes are equal to the wall thickness of the tubes plus the lengths of the nonsubmerged tube portions in contact with the water therein.

The length and configuration of the contact bar 133 determines the character of the ice rods 22. As illustrated, the contact bar 133 terminates at 133a to terminate the flow of circulating air during the freezing event of the operating cycle, thus producing an ice rod 22 which, when severed, results in an ice unit 26 (Fig. 9) having a clear surface layer 151 and an opaque core 152 if foreign matter is present in the water. Should the freezing event be terminated when the contact 143 reaches the end 133a of the contact bar 133, the resulting ice unit 26 will be tubular and will be formed of clear ice 151. If coloring matter, such as a food coloring, is introduced into the water being frozen, the resulting ice unit 26 will have a clear surface layer 151 and a colored core 152. It will be apparent that by varying the angular position of the contact bar 133 relative to the timing plate 118, the initial flow of circulating air may be delayed until an ice rod (not shown) with a colored or opaque surface layer and a clear core is produced. Similarly, by providing a contact bar 133 which includes several separate spaced segments (not shown), the flow of circulating air may alternately be started and terminated during the freezing event to produce an ice rod with alternate layers of clear and colored, or opaque ice.

After the water in the tubes 11 has been frozen to the desired extent, the contact bar 136 engages the contact 146 to close the elevating circuit of the inclining means 17, thus energizing the motor 46 which elevates the freezing unit 10 into the harvesting position. The angular position of the contact bar 136 relative to the timing plate 118 is determined by the time required to freeze the water in the tubes 11 to the desired extent and the length thereof is determined by the time required to elevate the freezing unit 10.

While the freezing unit 10 is being elevated, or thereafter, the contact bar 134 engages the contact 144 to close the circuit of the thawing means 21, thus energizing the thawing water valve 77 and oscillating motor 82 simultaneously. The thawing water is sprayed over the tubes 11 by the oscillating spray tubes 69 to thaw the surface of the ice rods 22, the expended thawing water being drained through the drain tube 34. The ice rods 22 are thus released from the tubes 11 and slide downwardly against the stop plate 115, the position of the later relative to the freezing unit 10 being determined by the desired length of the ice units 24 and 26.

After the ice rods 22 have been released in this manner, the contact bar 135 engages the contact 145 to close the circuit of the severing means 23, thus energizing the sawing motor 93 and saw reciprocating motor 109. The saw 92 repeatedly traverses the ice rods 22 to sever them into ice units 24 or 26 as the ice rods 22 continue to slide downwardly against the stop plate 115 in response to the action of the thawing water. The lengths and relative angular positions of the thawing means contact bar 134 and the severing means contact bar 135 are determined by the time required to thaw and sever the ice rods 22.

After completion of the severing event of the operating cycle, the timing plate continues to rotate until the contact bar 131 again engages the contact 141 to initiate a repetition of the foregoing operating cycle.

Our method of an apparatus for freezing fluids materially reduces the time required for producing ice as compared to conventional methods of freezing water into large blocks of ice. Experiments with apparatus of the character described indicate a production rate of several times that obtainable with conventional equipment of comparable capacity, this being due primarily to the fact that the ice rods 22 are considerably smaller than conventional blocks of ice which results in higher heat transfer rates as mentioned previously. Moreover, the ice rods 22 are molded into the desired configuration directly by the tubes 11 and the expense of sawing large blocks of ice is thereby eliminated.

The resulting ice units 24 or 26 may be produced in a variety of solid colors, or may be formed of clear or opaque ice, or alternate layers of clear and colored, or opaque ice. Although the ice units 24 and/or 26 may be produced with a variety of cross-sectional configurations, the latter are preferably curvilinear and may be circular as illustrated. Cylindrical ice units are conveniently accommodated by conventional beverage glasses and when colored present an attractive appearance. Moreover, as the cylindrical ice cubes 24 and/or 26 are diverted to a point of accumulation by the chute 116, the individual units are less likely to refreeze and cohere because of the smaller mutual contact areas involved as compared to cubes or prisms.

Although we have herein described a particular application of an exemplary embodiment of a method of and apparatus for freezing fluids, we do not intend to be limited to the specific disclosures contained herein since the fundamental inventive concepts involved are susceptible to incorporation in various other embodiments without departing from the spirit of the invention; we hereby reserve the right to the protection offered by the full scope of our appended claims.

We claim as our invention:

1. In an apparatus for freezing a liquid, the combination of: means providing a receptacle for a refrigerant and a stationary freezing unit support; a freezing unit adapted to receive a liquid to be frozen; and means for pivotally connecting said freezing unit to said support for rotation about a stationary axis relative to said receptacle between a freezing position in which one end of said unit is disposed in said receptacle and a harvesting position in which said one end of said unit is removed from said receptacle and disposed above the other end of said unit.

2. In an apparatus for freezing a liquid, the combination of: means providing a receptacle for a refrigerant and a freezing-unit support; a freezing unit adapted to receive a liquid to be frozen; means for movably connecting said freezing unit to said support so that said freezing unit is movable relative to said receptacle between a freezing position in which at least a portion of said unit is disposed in said receptacle and a harvesting position in which said unit is removed from said receptacle; operating means for intermittently moving said unit between said positions; and means for controlling, in timed sequence, the operation of said operating means so that unit remains in said freezing position for a period of time sufficient to freeze liquid therein and remains in said harvesting position for a period of time sufficient to remove the frozen liquid therefrom.

3. In an apparatus for freezing a liquid, the combination of: a receptacle for a refrigerant; a freezing unit adapted to receive a liquid to be frozen; supporting means for said freezing unit adjacent said receptacle means for removably connecting said freezing unit to said supporting means so that said freezing unit is movable relative to said receptacle between a freezing position in which one end of said unit is disposed in said receptacle and a harvesting position in which said one end of said unit is removed from said receptacle; fluid introducing means arranged for introducing a circulating fluid into said freezing unit; liquid introducing means for introducing a liquid to be frozen into said freezing unit; and means for automatically controlling the operation of said fluid introducing means and said liquid introducing means so that the same are actuated only when said unit is in said freezing position.

4. In an apparatus for freezing a liquid, the combination of: a receptacle for a refrigerant; a freezing unit adapted to receive a liquid to be frozen, said freezing unit being movable relative to said receptacle between a freezing position in which one end of said unit is disposed in said receptacle and a harvesting position in which said one end of said unit is removed from said receptacle; fluid introducing means connected to said one end of said unit for introducing a circulating fluid thereinto; liquid introducing means arranged to introduce a liquid to be frozen into said freezing unit; thawing means associated with said unit and adapted to thaw frozen liquid therein; and means for controlling the operation of said means so that said fluid introducing means and said liquid introducing means are automatically controlled to be operative only when said unit is in said freezing position and said thawing means is automatically controlled to be operative only when said unit is in said harvesting position.

5. In an apparatus for freezing a liquid, the combination of: a receptacle for a refrigerant; an elongated freezing unit adapted to receive a liquid to be frozen, said freezing unit being movable relative to said receptacle between a freezing position in which at least a portion of said unit is disposed in said receptacle and a harvesting position in which said unit is removed from said receptacle; thawing means associated with said unit and adapted to thaw frozen liquid therein to an extent permitting the ready removal thereof from one end of said unit when said unit is in said harvesting position; and cutting means adjacent said one end of said unit when in said harvesting position and adapted to periodically cut said frozen liquid into short lengths as it emerges from said unit.

6. In an apparatus for freezing a liquid, the combination of: a receptacle for a refrigerant; a freezing unit adapted to receive a liquid to be frozen, said freezing unit being movable relative to said receptacle between a freezing position in which at least a portion of said unit is disposed in said receptacle and a harvesting position in which said unit is removed from said receptacle; thawing means associated with said unit and adapted to thaw frozen liquid therein to an extent permitting the ready removal thereof from said unit when said unit is in said harvesting position; cutting means associated with said unit and adapted to cut said frozen liquid as it emerges from said unit; and timing means for controlling the operation of said thawing means and said cutting means, to actuate the same only when said unit is in said harvesting position.

7. In an apparatus for freezing a liquid, the combination of: a freezing unit adapted to receive a liquid to be frozen, said freezing unit being movable between a freezing position and a harvesting position; means for introducing said liquid into said unit when said unit is in said freezing position; means for refrigerating said unit when it is in said freezing position so as to freeze said liquid; means for spraying said unit with a thawing fluid when said unit is in said harvesting position to release frozen liquid therefrom; and means for oscillating said spraying means.

8. In an apparatus for freezing a primary fluid, the combination of: an open-ended freezing unit pivotally movable on a fixed axis between a freezing position at a freezing station and a harvesting position angularly displaced from the horizontal at a second station; means for intermittently moving said freezing unit between said freezing and harvesting positions; means for introducing the primary fluid into said freezing unit when it is stationary in said freezing station; means for refrigerating said freezing unit when it is stationary in said freezing position at said freezing station so as to freeze the primary fluid therein; and means for applying a thawing fluid to said freezing unit when it is in said havesting position so as to release the frozen primary fluid.

9. An apparatus as set forth in claim 8 including means for introducing a circulating fluid into said freezing unit during refrigeration thereof with said freezing unit in said freezing position.

EDGAR H. PACE.
MAC H. PACE.

REFERENCES CITED

The following references are of record in the file of this patent:

UNITED STATES PATENTS

| Number | Name | Date |
| --- | --- | --- |
| 236,647 | Sweeney | Jan. 11, 1881 |
| 1,882,290 | Meagher | Oct. 11, 1932 |
| 1,925,616 | Velut | Sept. 5, 1933 |
| 1,997,341 | Perman | Apr. 9, 1935 |
| 2,026,227 | Foraker | Dec. 31, 1935 |
| 2,117,658 | Gilliam | May 17, 1938 |
| 2,133,521 | Wussow et al. | Oct. 18, 1938 |
| 2,200,424 | Kubaugh | May 14, 1940 |
| 2,252,913 | Baer | Aug. 19, 1941 |
| 2,264,971 | Glennan | Dec. 2, 1941 |
| 2,285,149 | D'Arcey | June 2, 1942 |
| 2,324,395 | Hoop | July 13, 1943 |
| 2,368,675 | Muffly | Feb. 6, 1945 |
| 2,374,997 | Hill | May 1, 1945 |
| 2,431,278 | Raver | Nov. 18, 1947 |
| 2,435,286 | Lucia | Feb. 3, 1948 |
| 2,462,757 | Loyez | Feb. 22, 1949 |

Certificate of Correction

Patent No. 2,533,616                      December 12, 1950

EDGAR H. PACE ET AL.

It is hereby certified that error appears in the printed specification of the above numbered patent requiring correction as follows:

Column 6, line 45, for "conected" read *connected*; column 10, line 8, before the word "unit" insert *said*; line 17, for "removably" read *movably*;

and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*